United States Patent
Tsuyuki et al.

(10) Patent No.: US 11,784,748 B2
(45) Date of Patent: Oct. 10, 2023

(54) NETWORK TEST APPARATUS AND NETWORK TEST METHOD

(71) Applicant: ANRITSU CORPORATION, Kanagawa (JP)

(72) Inventors: Akinobu Tsuyuki, Kanagawa (JP); Tomohiro Ito, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 138 days.

(21) Appl. No.: 17/182,560

(22) Filed: Feb. 23, 2021

(65) Prior Publication Data
US 2021/0273744 A1  Sep. 2, 2021

(30) Foreign Application Priority Data
Feb. 28, 2020  (JP) ................................ 2020-033641

(51) Int. Cl.
*H04L 1/00* (2006.01)
*H04L 27/02* (2006.01)

(52) U.S. Cl.
CPC ............ *H04L 1/0045* (2013.01); *H04L 27/02* (2013.01)

(58) Field of Classification Search
CPC .............................. H04L 1/0045; H04L 27/02
USPC ........................................................ 370/216
See application file for complete search history.

(56) References Cited

U.S. PATENT DOCUMENTS

| 11,005,598 B1* | 5/2021 | Jones ................ H03M 13/1575 |
| 2004/0264403 A1* | 12/2004 | Fette ...................... H04L 1/206 370/328 |
| 2020/0396021 A1* | 12/2020 | Schnizler .............. H04L 1/0045 |

FOREIGN PATENT DOCUMENTS

JP       2014-183429 A       9/2014

OTHER PUBLICATIONS

IEEE (400GBASE-LR8 Measurement Data for Reaches >10km, dated Jul. 11, 2018) (Year: 2018).*
ANRITSU (MT1000A Network Master Pro Operation Manual, dated Mar. 17, 2017, 15th edition) (Year: 2017).*
NetBlazer Series Multiservice Tester (Year: 2015).*

* cited by examiner

*Primary Examiner* — Christopher M Crutchfield
*Assistant Examiner* — Jean F Voltaire
(74) *Attorney, Agent, or Firm* — Pearne & Gordon LLP (57) ABSTRACT

An object of the present disclosure is to enable a network test even if a network is operated on the premise that an error occurs. According to the present disclosure, there is provided a network test apparatus including: a reception unit that receives a forward error correction symbol (FEC symbol) generated by using pulse amplitude modulation (PAM); a display unit; an input unit that acquires a threshold value for a pass or fail determination; and an arithmetic processing unit that corrects a symbol error of the FEC symbol received by the reception unit and performs the pass or fail determination based on the acquired threshold value by using the number of corrected symbol errors is provided, in which a result of the pass or fail determination is displayed on the display unit.

11 Claims, 10 Drawing Sheets

| Symbol Error | | |
|---|---|---|
| ○ | 2020-02-25 16:26:19 | 5.33E-08 |
| ● | 2020-02-25 16:26:24 | 2.35E-07 |
| ◐ | 2020-02-25 16:26:29 | 8.54E-06 |
| ◐ | 2020-02-25 16:26:34 | 2.36E-05 |
| ○ | 2020-02-25 16:26:39 | 3.10E-10 |
| ○ | 2020-02-25 16:26:44 | 3.92E-09 |
| ◐ | 2020-02-25 16:26:49 | 5.97E-09 |
| ○ | 2020-02-25 16:26:54 | 1.09E-07 |
| ○ | 2020-02-25 16:26:59 | 6.98E-10 |
| ○ | 2020-02-25 16:27:04 | 3.34E-09 |
| ○ | 2020-02-25 16:27:09 | 3.79E-08 |
| ○ | 2020-02-25 16:27:14 | 3.97E-08 |
| ○ | 2020-02-25 16:27:19 | 4.16E-08 |
| ◐ | 2020-02-25 16:27:24 | 3.23E-08 |
| ◐ | 2020-02-25 16:27:29 | 2.27E-07 |
| ◐ | 2020-02-25 16:27:34 | 2.17E-07 |

Unit: Ratio ▶
Threshold: 1.0E-08 ▶
Lane: Lane4 ▶

| Max Symbol Error Rate | 4.1E-08 |
|---|---|
| Uncorrected Codeword Count | 0 |

○ Pass  ◐ Warning  ● Fail

NETWORK TEST APPARATUS AND NETWORK TEST METHOD

TECHNICAL FIELD

The present disclosure is related to a network test apparatus and a network test method.

BACKGROUND ART

For 400 Gbit Ethernet (400 GbE) (Ethernet is a registered trademark) based on the IEEE 802.3 standard, for example, a 25 GBaud PAM4 signal×8 or a 50 GBaud PAM4×4 optical signal is used. Since a signal using such pulse amplitude modulation (PAM) having 3 or more has a plurality of voltage levels in one symbol, a difference in voltage from other values is small and erroneous determination is likely to occur. Further, the optical signal used in this standard has a high bit rate and low noise immunity. For this reason, in this standard, the network is operated on the premise that an error will occur, and it is essential to correct the occurring error and be operated by applying forward error correction (FEC).

The FEC is a coding technology for correcting an error that occurs on a network and restoring the network to the original state. When the FEC is applied, communication data is converted into a unit called a symbol (hereinafter, referred to as an FEC symbol) and transmitted, and an error occurring in each FEC symbol is corrected at a time of reception. According to the FEC standard, when a symbol error equal to or greater than a certain level occurs, the occurring error cannot be corrected. Therefore, the more symbol errors which are FEC symbol errors, the higher the possibility that communication data will be lost, and the "symbol error occurrence rate" is an important indicator in evaluating the network.

In a case where it is assumed that a symbol error will occur in a network, a result of the network test apparatus will always output a warning, so that the test result will not pass. Therefore, since it is necessary for a tester to make a pass or fail determination based on the number of occurring symbol errors, not only labor and time are required, but also an erroneous determination may occur.

The following documents are available as network test apparatuses.

RELATED ART DOCUMENT

Patent Document

[Patent Document 1] JP-A-2014-183429

DISCLOSURE OF THE INVENTION

Problem that the Invention is to Solve

An object of the present disclosure is to enable a test capable of guaranteeing a quality of a network, and to easily perform a pass or fail determination even if the network is operated on the premise that an error occurs.

Means for Solving the Problem

In order to achieve the above object, the present disclosure allows a certain number of symbol errors to occur when determining a symbol error in a network test apparatus. A permitted rate of symbol error depends on the network which is device under test (DUT). Therefore, a threshold value is used to determine the symbol error to be allowed, and the threshold value can be set for each test. In addition, by displaying the result, it is possible to easily perform the determination.

Specifically, according to the present disclosure, there is provided a network test apparatus including: a reception unit that receives a forward error correction symbol (FEC symbol) generated by using pulse amplitude modulation (PAM); a display unit; an input unit that acquires a threshold value for a pass or fail determination; and an arithmetic processing unit that corrects a symbol error of the FEC symbol received by the reception unit and performs the pass or fail determination based on the acquired threshold value by using the number of corrected symbol errors is provided, in which a result of the pass or fail determination is displayed on the display unit.

Specifically, according to the present disclosure, there is provided a network test method for receiving and displaying a forward error correction symbol (FEC symbol) generated by using pulse amplitude modulation (PAM), the method including: acquiring a threshold value for a pass or fail determination; correcting a symbol error of the received FEC symbol and performing the pass or fail determination based on the acquired threshold value by using the number of corrected symbol errors; and displaying a result of the pass or fail determination.

Advantage of the Invention

According to the present disclosure, even if a network is operated on the premise that an error occurs, it is possible to perform a test capable of guaranteeing a quality of the network, and it is possible to easily determine a pass or a fail.

BEST MODE FOR CARRYING OUT THE INVENTION

Hereinafter, embodiments according to the present disclosure will be described in detail with reference to drawings. The present disclosure is not limited to the embodiments described below. These embodiments are merely examples, and the present disclosure can be implemented in various modifications and improvements based on the knowledge of those skilled in the art. In this specification and the drawings, configuration elements having the same reference numerals indicate the same elements.

First Embodiment

Figure 1:
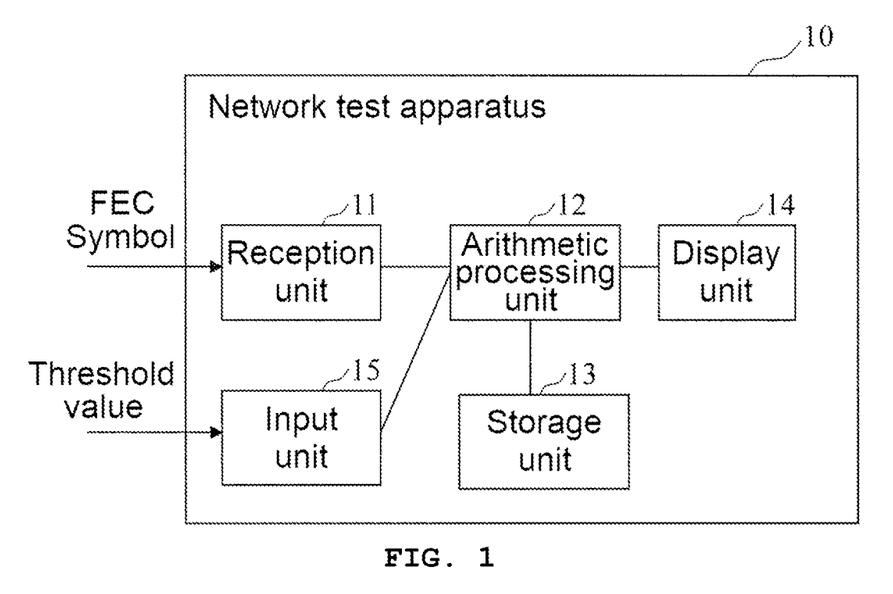
FIG. 1 illustrates an example of a configuration of a network test apparatus.

FIG. 1 illustrates an example of a configuration of a network test apparatus. A network test apparatus 10 according to the present embodiment includes a reception unit 11, an arithmetic processing unit 12, a storage unit 13, a display unit 14, and an input unit 15. The reception unit 11 and the arithmetic processing unit 12 can also be realized by a computer and a program, and the program can be recorded on a recording medium or provided through a network.

The reception unit 11 receives an FEC symbol generated by using pulse amplitude modulation (PAM). As FEC, for example, reed solomon (RS) defined by 400 Gbit Ethernet (400 GbE) (Ethernet is a registered trademark) based on the IEEE 802.3 standard can be used.

Figure 2:
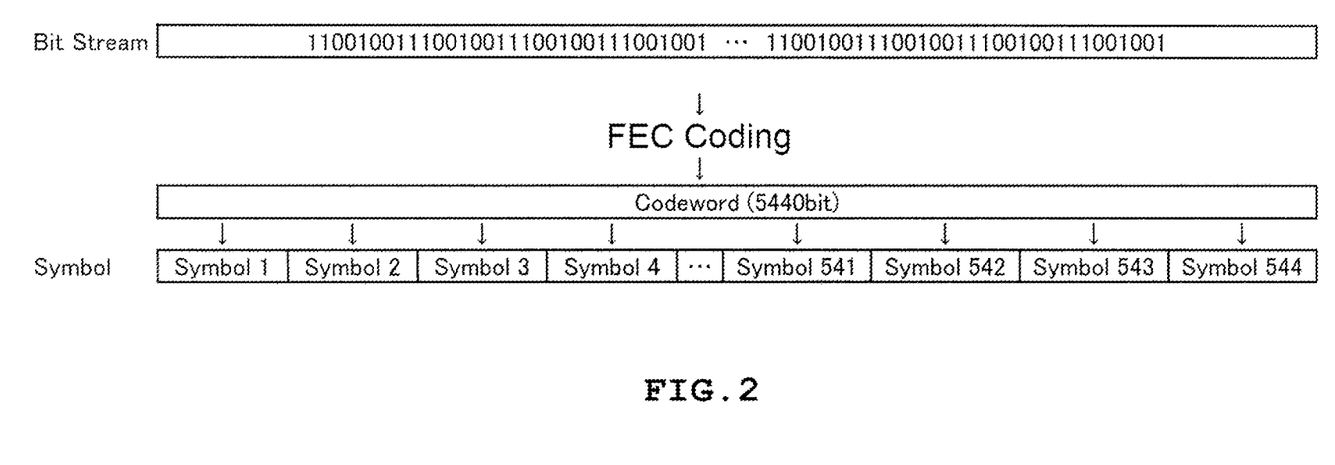
FIG. 2 illustrates an example of signal coding by FEC.

FIG. 2 illustrates an example of signal coding by FEC. FIG. 2 illustrates RS-FEC (reed solomon FEC) using RS (544, 514) as an example. In the RS-FEC, a data stream is divided into a fixed size and coded. This coded unit is called a codeword. The codeword is divided into units called symbols (FEC symbols), and error correction is performed in units of FEC symbols.

In the RS-FEC using RS (544, 514), error correction succeeds in a case where the number of symbol errors of the codeword is equal to or less than 15, and the error correction fails in a case where the number of symbol errors of the codeword is equal to or greater than 16. Here, the number of symbol errors is the number of FEC symbols of which errors are successfully corrected, among FEC symbols included in the codeword. A codeword that succeeds in error correction is called "Correctable Codeword", and a codeword that fails in error correction is called "Uncorrectable Codeword".

The input unit 15 acquires a threshold value for a pass or fail determination of a symbol error. For example, the threshold value is a threshold value for a symbol error rate or a threshold value for the number of symbol errors. The symbol error rate is, for example, a ratio of the number of FEC symbols in which a symbol error is corrected to the number of FEC symbols received by the reception unit 11. The input unit 15 can use any input means such as a keyboard, a mouse, or a touch panel. The input unit 15 may be a means for receiving a control signal for acquiring a command from the outside.

Figure 3:
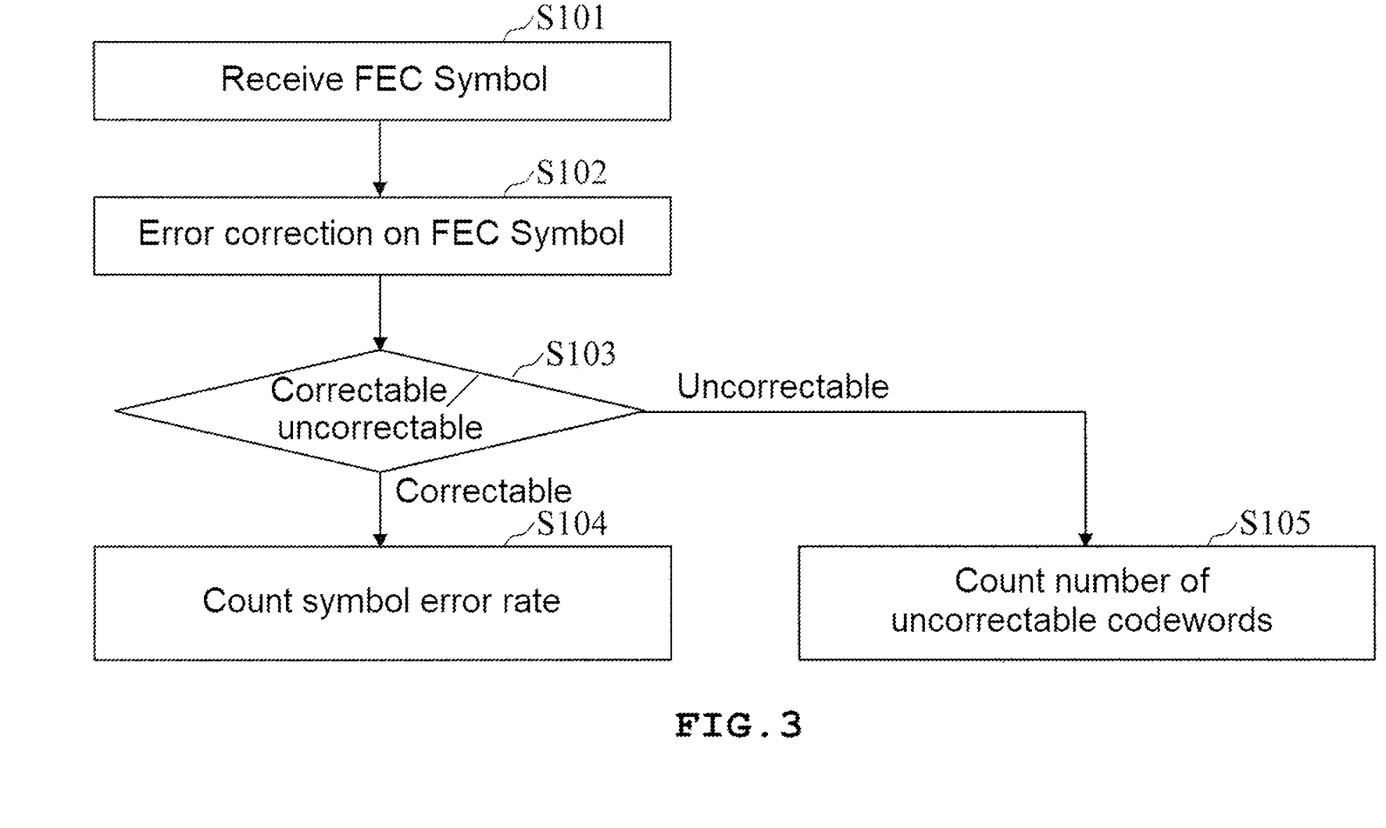
FIG. 3 illustrates an example of an operation of the network test apparatus.

FIG. 3 illustrates an example of an operation of the network test apparatus. The reception unit 11 receives a codeword (S101), and the arithmetic processing unit 12 corrects an error of each FEC symbol by using a parity included in the codeword (S102).

In a case where the codeword received by the reception unit 11 is "Uncorrectable Codeword" (Uncorrectable in S103), information on all the symbols included in the codeword including a symbol without an error is lost. Therefore, the arithmetic processing unit counts the number of codewords for which error correction cannot be performed (S105). For example, the arithmetic processing unit 12 increments the count of the number of codewords of the "Uncorrectable Codeword" stored in the storage unit 13, by 1.

In a case where the codeword received by the reception unit 11 is "Correctable Codeword" (Correctable in S103), the arithmetic processing unit 12 calculates the symbol error rate, and stores the symbol error rate in the storage unit 13 (S104). The arithmetic processing unit 12 may calculate the number of symbol errors instead of calculating the symbol error rate.

In step S104, the arithmetic processing unit 12 further performs a pass or fail determination based on a threshold value. The pass or fail determination is, for example, classification into any one of a pass, a fail, and a warning. For example, in a case where the codeword received by the reception unit 11 is "Uncorrectable Codeword" (Uncorrectable in S103), the arithmetic processing unit 12 determines that the codeword fails. In a case where the symbol error rate is lower than the threshold value, the arithmetic processing unit 12 determines that the codeword passes. In a case where the symbol error rate is equal to or greater than the threshold value, the arithmetic processing unit 12 determines the warning.

Figure 4:
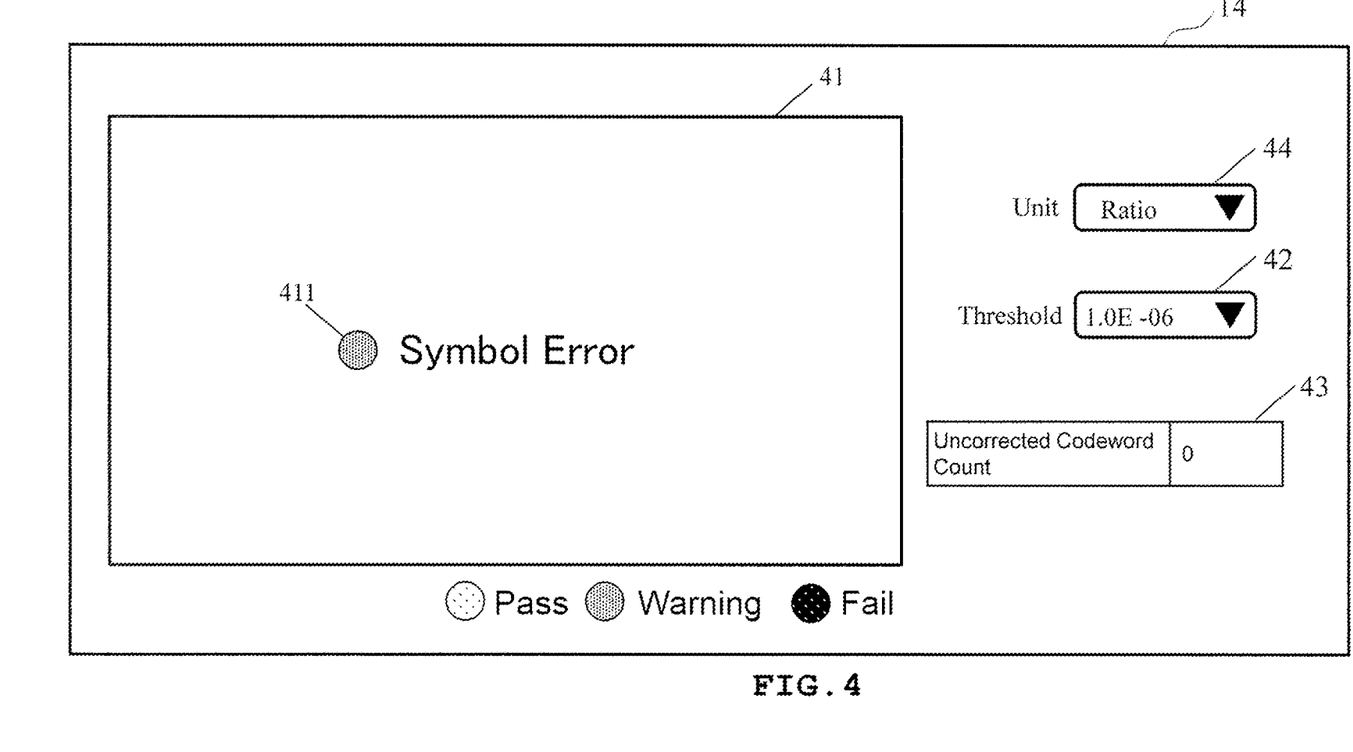
FIG. 4 illustrates a first display example of a display unit according to a first embodiment.

FIG. 4 illustrates a display example of the display unit 14. The display unit 14 displays a threshold value for a symbol error in a window 42, and displays a result of a pass or fail determination based on the threshold value in a window 41. The window 42 functions as the input unit 15 that acquires the threshold value input in the window. In a case where the threshold value for the symbol error is input from the outside by using a command or the like, the display unit 14 displays the input threshold value in the window 42.

The window 41 displays the pass or fail determination based on the threshold value displayed in the window 42. For example, a mark 411 indicating a pass, a fail, and a warning is displayed. The mark 411 is displayed, for example, in green in a case of the pass, in red in a case of the fail, and in yellow in a case of the warning.

Figure 5:
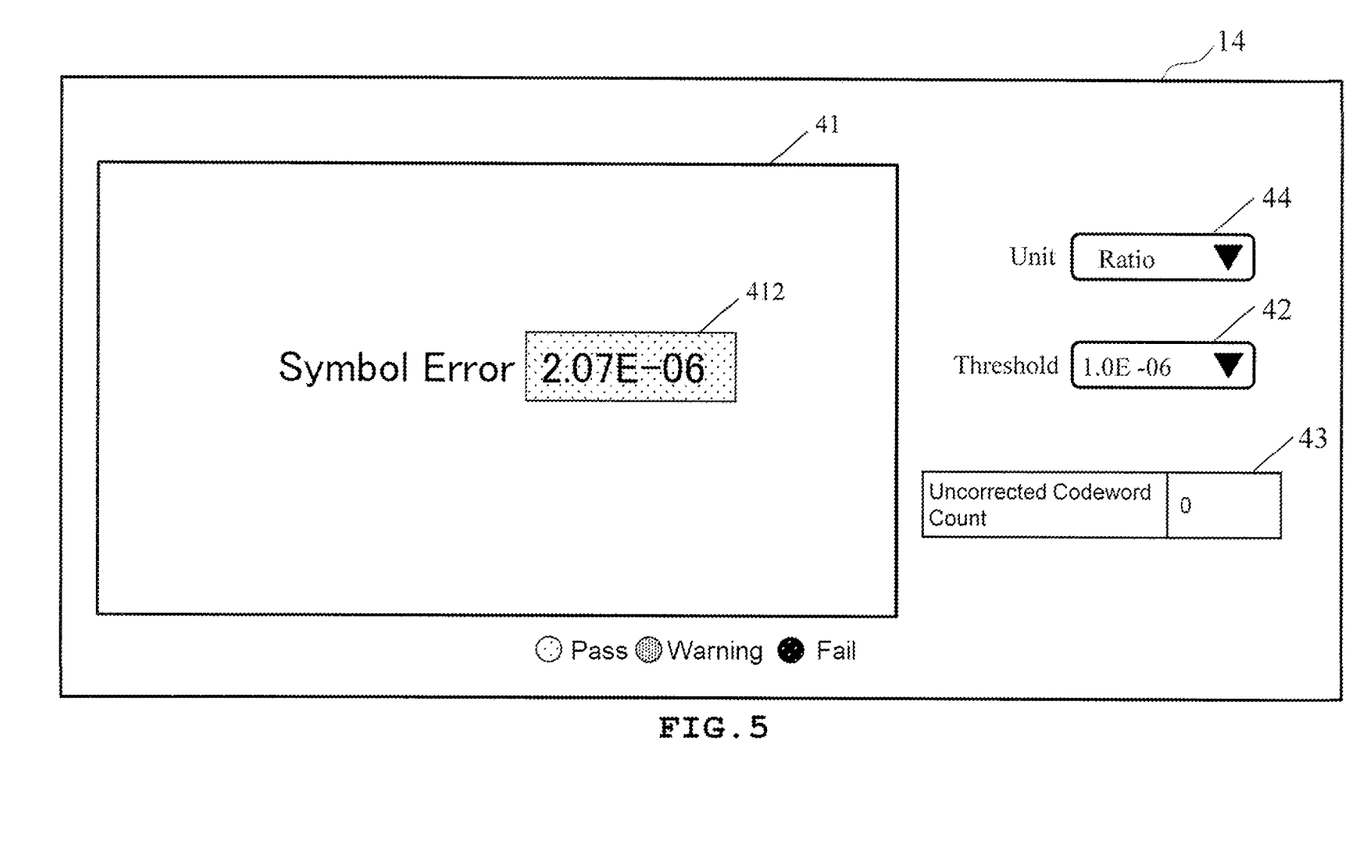
FIG. 5 illustrates a second display example of the display unit according to the first embodiment.

The window 41 may display a symbol error rate or a numerical value of the symbol error, as illustrated in FIG. 5. In this case, instead of the mark 411 illustrated in FIG. 4 or together with the mark 411, a display field 412 of the numerical value of the symbol error rate may be highlighted. The highlighting includes, for example, any form of highlighting a numerical value or a surround of the numerical value with a color such as yellow.

The display unit 14 may display a window 44 for selecting a target for the pass or fail determination. For example, "Ratio" for displaying the symbol error rate and "Count" for displaying the number of symbol errors are displayed. When the "Ratio" is selected by a user, the display unit 14 displays the symbol error rate as illustrated in FIG. 5 in the display field 412. When the "Count" is selected by the user, the display unit 14 displays the number of symbol errors in the display field 412.

The display unit 14 may display a field 43 for displaying the number of codewords of the "Uncorrectable Codeword".

As described above, since the present disclosure displays the result of the pass or fail determination based on the threshold value set by the user, the user can easily determine the pass or fail. By setting the threshold value to a value that can guarantee a quality of the network, it is possible to perform a test capable of guaranteeing the quality of the network even if the network is operated on the premise that an error will occur.

Second Embodiment

As illustrated in FIG. 2, in a case where the codeword is divided into 16 lanes, the symbol error rate changes for each lane, so it is necessary to adjust emphasis for each lane. The symbol error rate is also used as an indicator when emphasizing an optical transceiver. Therefore, in the present embodiment, a pass or fail determination of a symbol error based on a threshold value is performed for each lane.

In the present embodiment, in step S104, the arithmetic processing unit 12 calculates a symbol error rate for each lane and makes the pass or fail determination based on the threshold value for each lane.

Instead of calculating the symbol error rate, the arithmetic processing unit 12 may calculate the number of symbol errors for each lane and make the pass or fail determination based on the threshold value.

Figure 6:
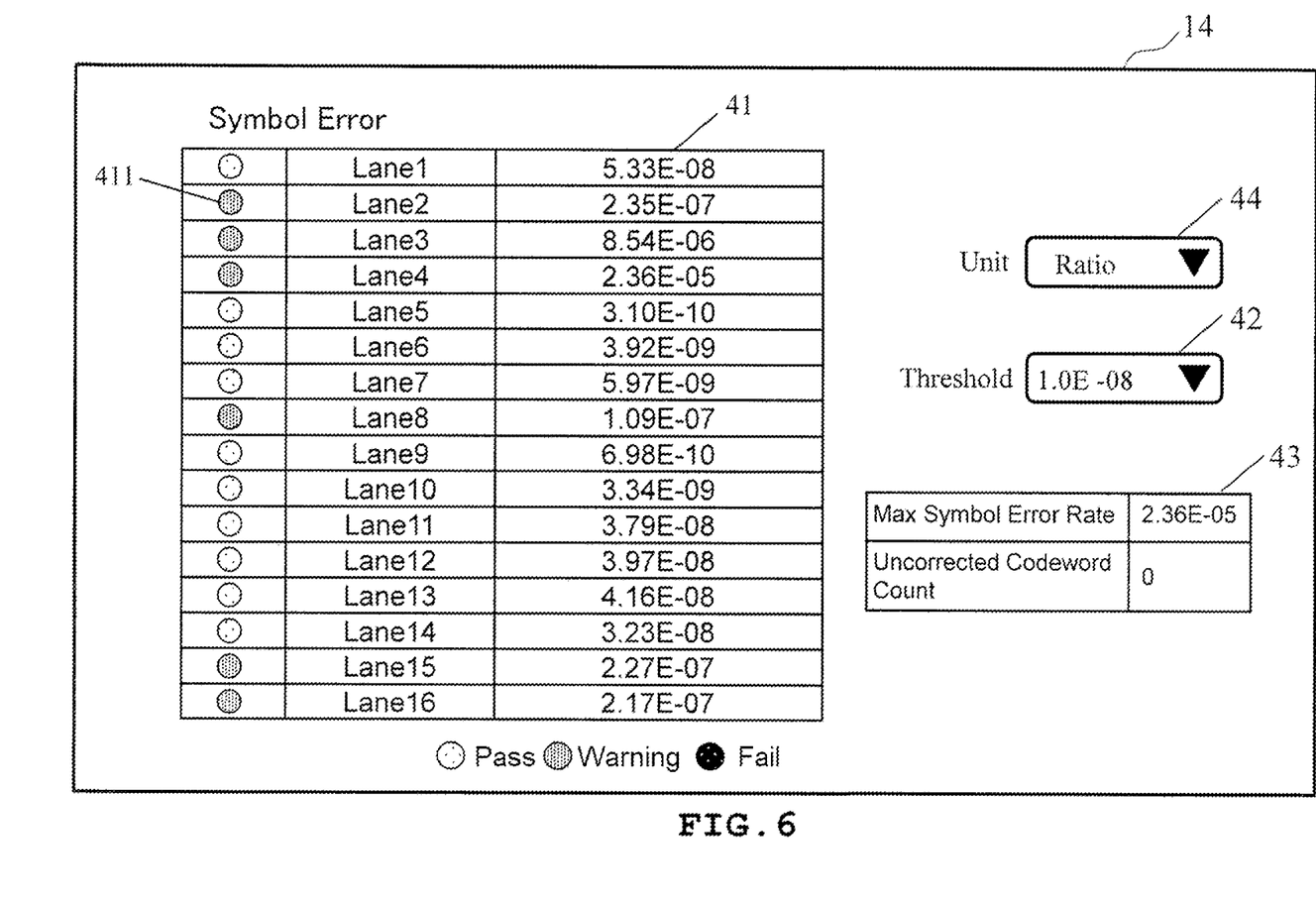
FIG. 6 illustrates a first display example of a display unit according to a second embodiment.

FIG. 6 illustrates a first display example of the display unit 14 according to the present embodiment. In the present embodiment, an example is illustrated in which a symbol error rate and the mark 411 having a pass or fail determination for each of lanes 1 to 16 are displayed in a list. In the same manner as in the first embodiment, for the symbol error rate, a numerical value of the symbol error rate may be highlighted instead of the mark 411 or together with the mark 411.

Figure 7:
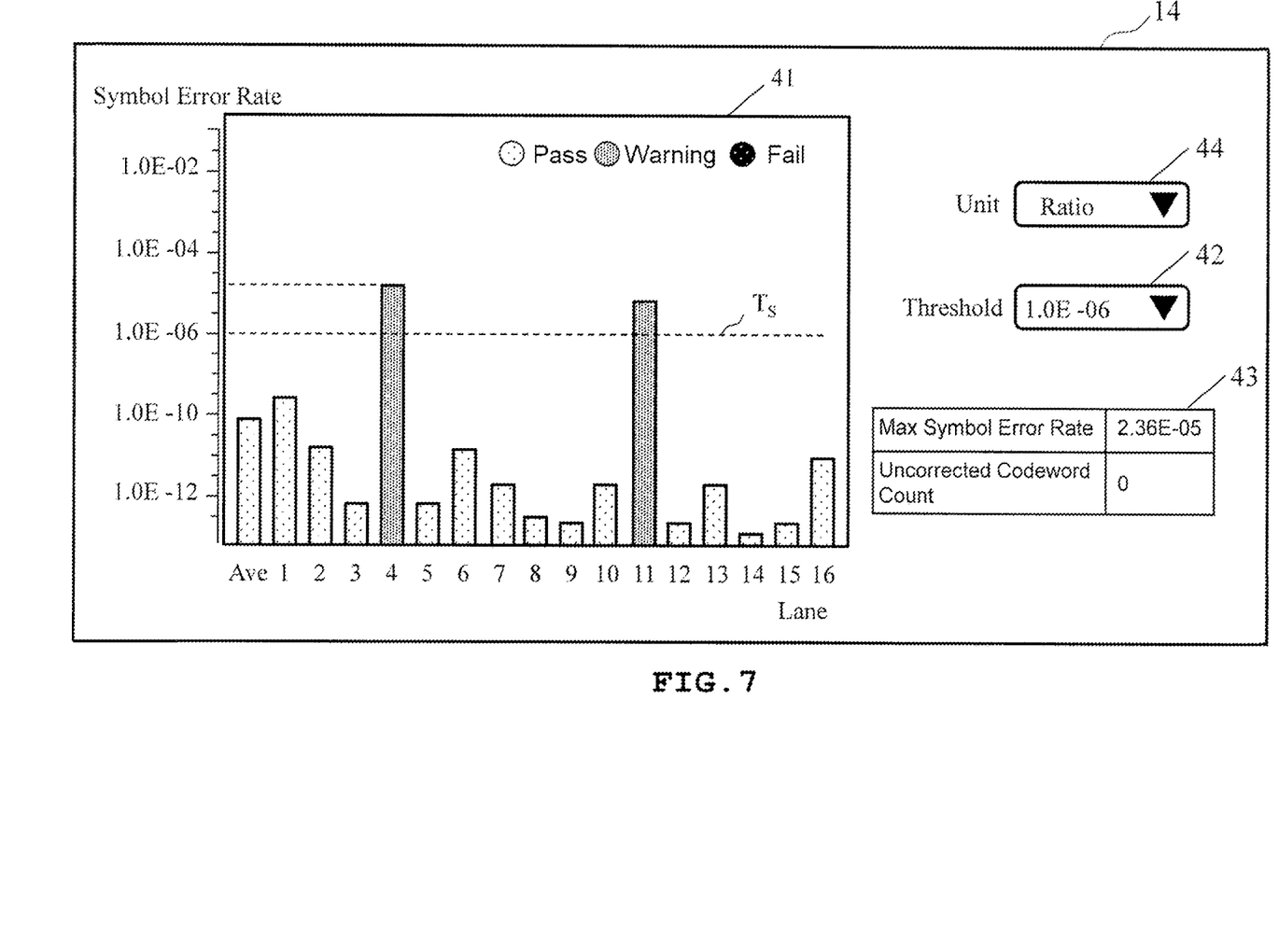
FIG. 7 illustrates a second display example of the display unit according to the second embodiment.

FIG. 7 illustrates a second display example of the display unit 14 according to the present embodiment. In FIG. 7, the display unit 14 displays a graph of a symbol error rate in each lane in the window 41. In FIG. 7, as an example, a bar graph in which a horizontal axis illustrates each lane and a vertical axis illustrates a symbol error rate is illustrated. A color of the graph display in the window 41 differs depending on a result of a pass or fail determination according to a threshold value. For example, in a case of the pass, the graph is displayed in green, in a case of the fail, the graph is displayed in red, and in a case of the warning, the graph is displayed in yellow.

The display unit 14 displays a threshold value $T_s$ input by the input unit 15 to the window 41. The threshold value $T_s$ can be freely set by the user by using movement of a line of the threshold value $T_s$ in the window 42 or window 41.

Further, the display unit 14 may display the list display illustrated in the window 41 illustrated in FIG. 6 and the graph display illustrated in the window 41 illustrated in FIG. 7 on the same screen.

Further, in the present embodiment, a maximum value, a minimum value, and an average value in all lanes may be displayed for the symbol error rate. The display may be a list display as illustrated by a reference numeral 43 in FIGS. 6 and 7, or may be a graph display as illustrated in the window 41 in FIG. 7. The list display illustrated by the reference numeral 43 in FIGS. 6 and 7 illustrates an example in which only the maximum value in all lanes is displayed, and the average value may be displayed instead of the maximum value or together with the maximum value.

Further, although only the average value (Ave) is displayed in the graph display as illustrated in the window 41 in FIG. 7, the maximum value may be displayed in the graph instead of the average value or together with the average value.

As described above, in the network test apparatus 10 according to the present disclosure, by setting the threshold value $T_s$ for the symbol error rate and comparing the symbol error generated in each lane and the threshold value $T_s$, it is possible to rapidly determine a pass or a fail at a time of calibration of the optical transceiver.

Further, in the present embodiment, the symbol error rate for each lane is graphically displayed by using the display unit 14. Therefore, in the present disclosure, the pass or fail determination of the network can be performed without ignoring occurrence of the symbol error. In addition, it is possible to prevent the occurrence of other errors from being overlooked by the warning due to the symbol error that always occurs.

Third Embodiment

In the present embodiment, the display unit 14 simultaneously displays symbol error rates measured at different times in the window 41.

In the present embodiment, in step S104, the arithmetic processing unit 12 calculates a symbol error rate for each time and makes a pass or fail determination based on a threshold value. Instead of calculating the symbol error rate, the arithmetic processing unit 12 may calculate the number of symbol errors for each hour and make a pass or fail determination based on the threshold value. As described above, in the present embodiment, the pass or fail determination is performed at each time instead of each lane in the second embodiment.

Figure 8:
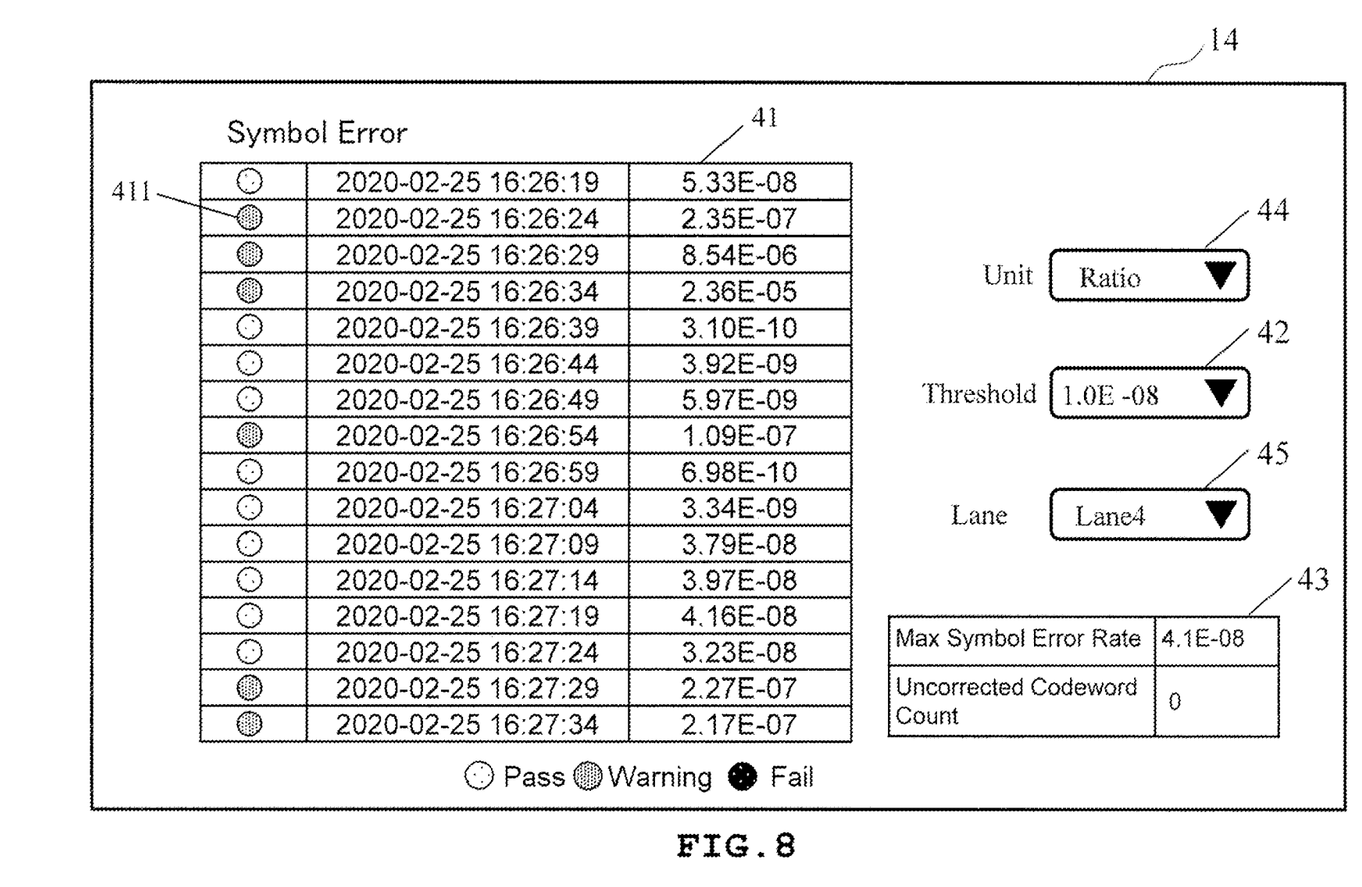
FIG. 8 illustrates a first display example of a display unit according to a third embodiment.

FIG. 8 illustrates a first display example of the display unit 14 according to the present embodiment. In the present embodiment, a symbol error rate and the mark 411 having a pass or fail determination for each time are displayed. In the same manner as in the first embodiment, for the symbol error rate, a numerical value of the symbol error rate may be highlighted instead of the mark 411 or together with the mark 411. In FIG. 8, as an example, a result of a lane 4 is displayed for each unit time. The display unit 14 displays a lane selection unit 45 in which a lane can be selected. The lane selection unit 45 displays lane numbers of 1 to 16, and the user can select one of the lane numbers.

Figure 9:
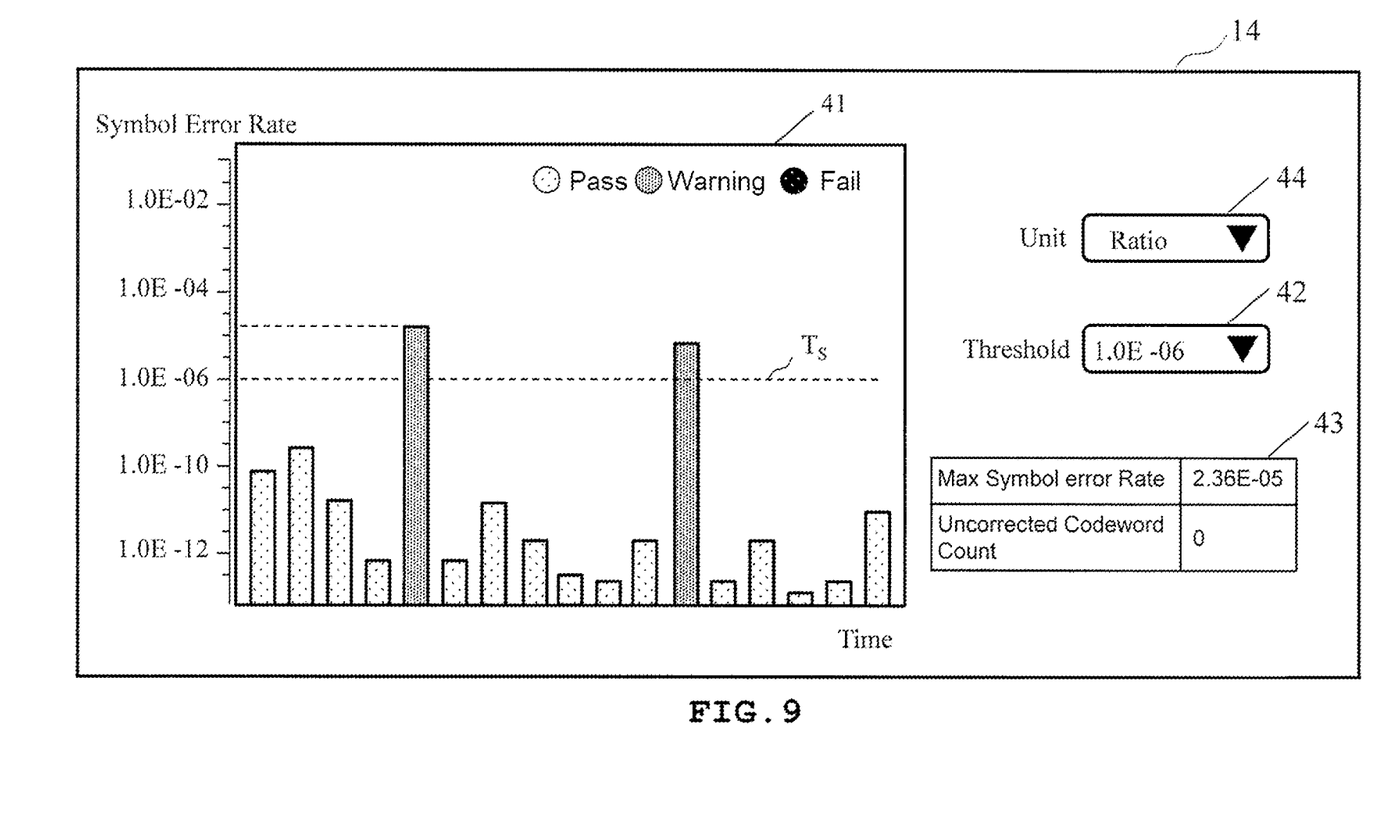
FIG. 9 illustrates a second display example of the display unit according to the third embodiment.

FIG. 9 illustrates a second display example of the display unit 14 according to the present embodiment. In FIG. 9, the display unit 14 displays a graph of a symbol error rate at each time in the window 41. In FIG. 9, as an example, a bar graph in which a horizontal axis indicates each time and a vertical axis indicates a symbol error rate is displayed.

According to the present embodiment, since the results before and after the setting change are displayed on the same screen, it is possible to compare a time change of the symbol error rate. Further, by displaying the graph in real time, it is possible to intuitively compare the effects of changing the calibration settings.

The present embodiment can be applied to the second embodiment. For example, the display unit 14 may perform three-dimensional display in which each lane is displayed on an x-axis, each time is displayed on a y-axis, and a symbol error rate is displayed on a z-axis.

Fourth Embodiment

Figure 10:
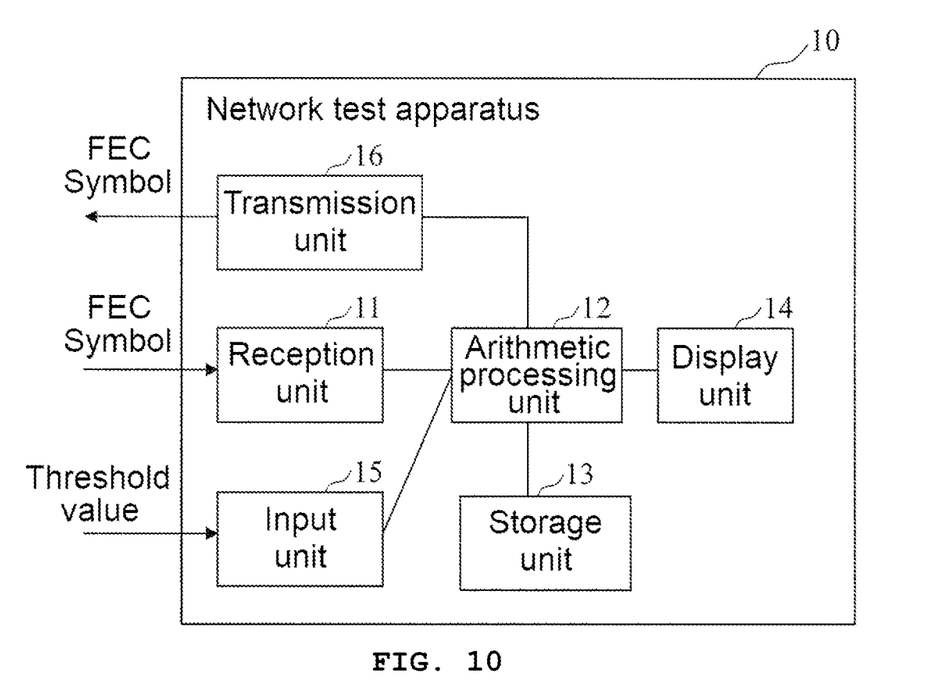
FIG. 10 illustrates another example of the configuration of the network test apparatus.

FIG. 10 illustrates an example of another form of the network test apparatus according to the present disclosure. The network test apparatus 10 according to the present disclosure may further include a transmission unit 16 that transmits an FEC symbol by using a plurality of lanes.

The arithmetic processing unit 12 generates an FEC symbol of 400 Gbit Ethernet (400 GbE) (Ethernet is a registered trademark) based on the IEEE 802.3 standard. The transmission unit 16 outputs the FEC symbol generated by the arithmetic processing unit 12 to a network which is a device under test (DUT). Here, the arithmetic processing unit 12 can generate an FEC symbol having a state in which any error occurs, and cause the transmission unit 16 to transmit the FEC symbol.

The reception unit 11 receives the FEC symbol from the network which is a device under test (DUT). The display unit 14 displays a result of a pass or fail determination based on a threshold value set by the user. As a result, the user can confirm an operation of the network which is a device under test (DUT) based on the symbol error displayed on the display unit 14.

INDUSTRIAL APPLICABILITY

The present disclosure can be applied to information communication industry.

DESCRIPTION OF REFERENCE NUMERALS AND SIGNS

10: Network test apparatus
11: Reception unit
12: Arithmetic processing unit
13: Storage unit
14: Display unit
15: Input unit
16: Transmission unit

What is claimed is:

1. A network test apparatus comprising:
a receiver configured to receive forward error correction symbols (FEC symbols) in each of a plurality of codewords generated by using pulse amplitude modulation (PAM);
a display;
an input interface configured to acquire a threshold value determined based on an acceptable number of corrected FEC symbols in each codeword for a pass or fail determination; and
a processor configured to:
correct symbol errors of the FEC symbols in each of the plurality of codewords received by the receiver, and
perform the pass or fail determination for each of the plurality of codewords by comparing the acquired threshold value to a number of corrected symbol errors in each codeword,
wherein a result of the pass or fail determination for each of the plurality of codewords is displayed on the display.

2. The network test apparatus according to claim 1, wherein as the pass or fail determination, the processor is configured to determine a pass in a case where the number of corrected symbol errors in each codeword is less than the threshold value, and determine a warning in a case where the number of corrected symbol errors in each codeword is equal to or greater than the threshold value, and
the display is configured to display the result of the pass or fail determination for each codeword in different colors depending on the warning or the pass.

3. The network test apparatus according to claim 2, wherein the display is further configured to:
display the number of symbol errors in each codeword as a graph, and
display the acquired threshold value inside the graph display.

4. The network test apparatus according to claim 1, wherein
the processor is further configured to perform the pass or fail determination for each lane representing a codeword, and
the display is further configured to display a result of the pass or fail determination for each lane.

5. The network test apparatus according to claim 1, wherein the number of symbol errors is a symbol error rate for the FEC symbols in the codeword received by the receiver.

6. The network test apparatus according to claim 1, further comprising:
a transmitter configured to generate the FEC symbols by using the pulse amplitude modulation (PAM) and transmits the generated FEC symbols.

7. A network test method for receiving and displaying forward error correction symbols (FEC symbols) in each of the plurality of codewords generated by using pulse amplitude modulation (PAM), the method comprising:
acquiring a threshold value determined based on an acceptable number of corrected FEC symbols in each of a plurality of codewords for a pass or fail determination;
correcting symbol errors of the received FEC symbols in each of codeword and performing the pass or fail determination for each of the plurality of codewords by comparing the acquired threshold value to a number of corrected symbol errors in each of the plurality of codewords; and
displaying a result of the pass or fail determination for each of the plurality of codewords.

8. The network test method according to claim 7, wherein as the pass or fail determination, in a case where the number of corrected symbol errors in each codeword is less than the threshold value, a pass is determined, and in a case where the number of corrected symbol errors in each codeword is equal to or greater than the threshold value, a warning is determined, and
the result of the pass or fail determination is displayed in different colors depending on the warning or the pass.

9. The network test method according to claim 8, wherein the number of symbol errors in each codeword is displayed as a graph, and
the acquired threshold value inside the graph display is displayed.

10. The network test method according to claim 7, wherein
the pass or fail determination is performed for each lane representing a codeword, and
a result of the pass or fail determination is displayed for each lane.

11. The network test method according to claim 7, wherein the number of symbol errors is a symbol error rate for the received FEC symbols in each codeword.

* * * * *